May 2, 1944.  O. R. BRINEY, JR  2,347,766
GRINDING MACHINE
Filed May 21, 1942  2 Sheets-Sheet 1

INVENTOR.
OTTIS R. BRINEY, JR.
BY Richey & Watts
ATTORNEYS.

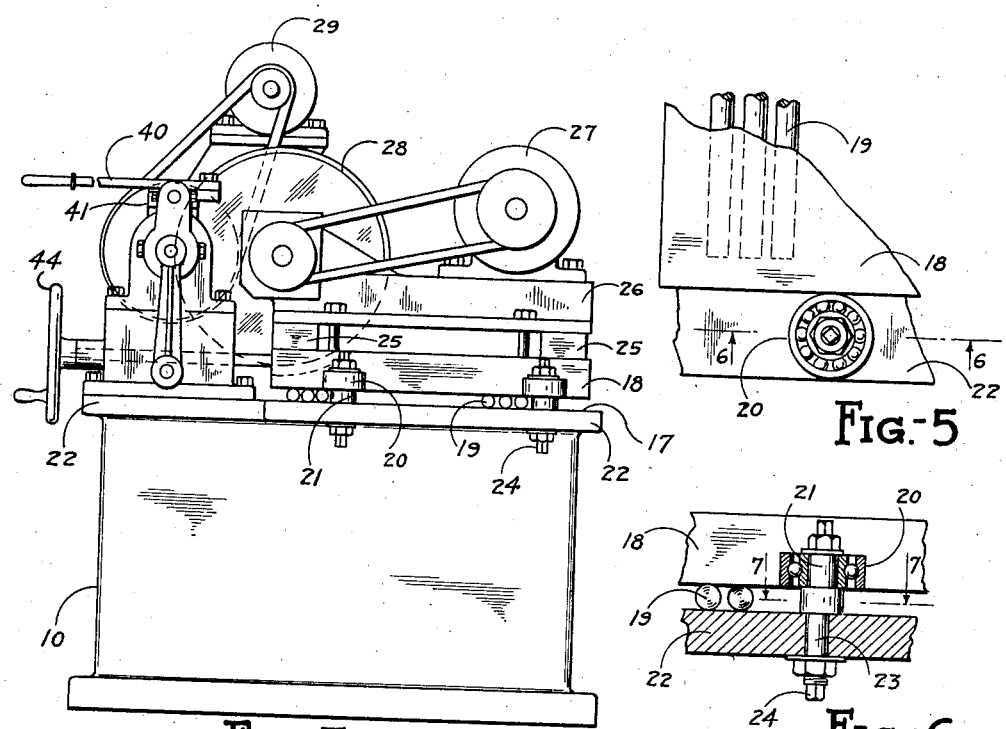
Fig.-3
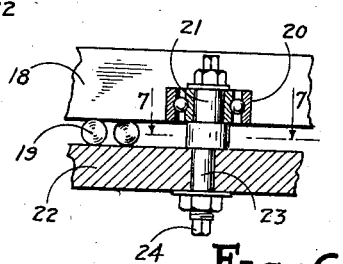
Fig.-5
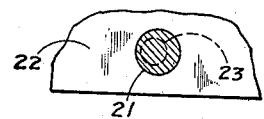
Fig.-6
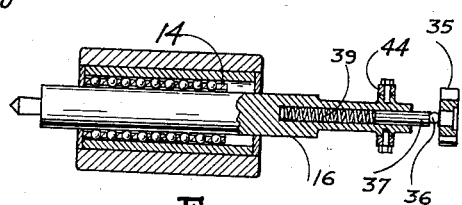
Fig.-7
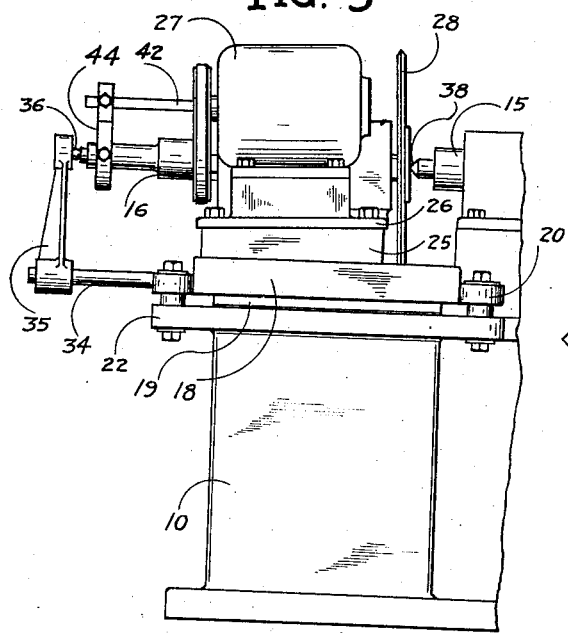
Fig.-4
Fig.-8
INVENTOR.
OTTIS R. BRINEY, JR.
BY
ATTORNEYS.

Patented May 2, 1944

2,347,766

UNITED STATES PATENT OFFICE 2,347,766

GRINDING MACHINE

Ottis R. Briney, Jr., Pontiac, Mich.

Application May 21, 1942, Serial No. 443,871

3 Claims. (Cl. 51—95)

This invention relates broadly to machine tools and more specifically to thread grinding machines.

One of the objects of the invention is to provide mechanism for equalizing the thrust imposed upon the threads of the spindle lead screw.

Another object of the invention is to provide mechanism associated with the spindle carrying the live center to effect simultaneous axial movement of the dead center.

Another object of the invention is to interlink the outer ends of the head and foot stock spindles in such a manner as to relieve the spindle lead screw of the spring load imposed upon the work through the foot stock dead center.

Another object of the invention is to drive the spindle of the machine from a reversible electric motor and to provide an operative control therefor which is actuated from the spindle during axial movement thereof.

Another object of the invention is to provide a spring pressed dead center structure and mechanism for the ready release of the work supported thereby.

Other objects and advantages more or less ancillary to the foregoing and the manner in which all the various objects are realized will appear in the following description, which considered in connection with the accompanying drawings, sets forth the preferred embodiment of the invention.

Referring to the drawings:

Fig. 3 is an end elevational view of the machine illustrated in Figs. 1 and 2;

Fig. 4 is a fragmentary portion of a rear elevational view of the machine;

Fig. 5 is a plan view shown upon an enlarged scale of a portion of the slide shown in Fig. 1;

Fig. 6 is a transverse section through a portion of the bed of the machine and slide illustrated in Fig. 5; the section being taken on the plane indicated by the lines 6—6 of Fig. 5;

Fig. 7 is a transverse section through the eccentric bolt for supporting the bearing, the section being taken on a plane indicated by the line 7—7 in Fig. 6; and Fig. 8 is a horizontal section through the foot stock spindle, the section being taken on a plane indicated by the line 8—8 in Fig. 2.

Figure 1:
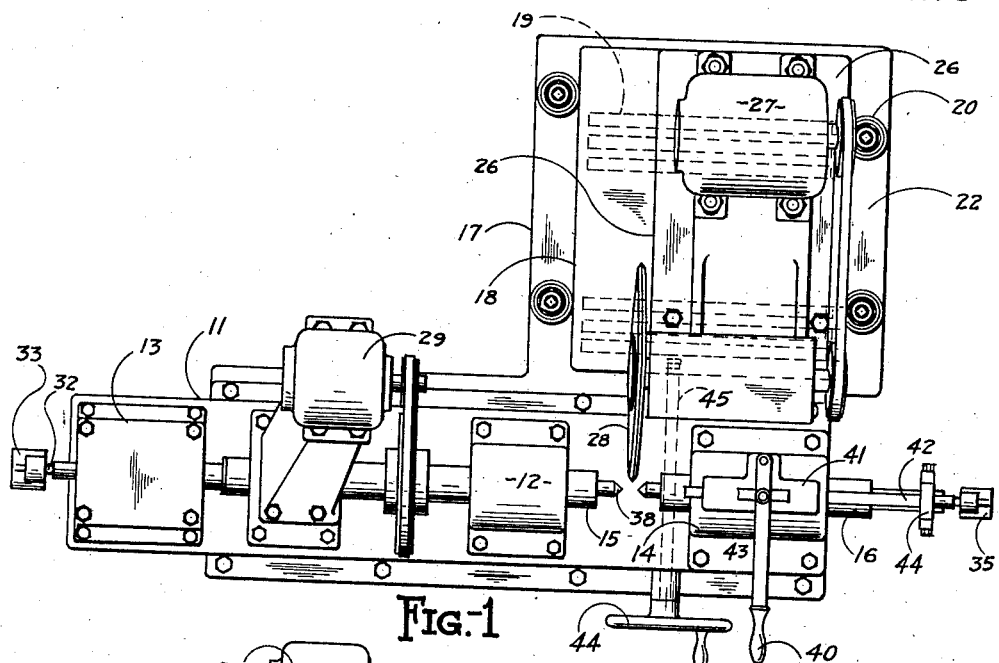
Fig. 1 is a plan view of a thread grinding machine embodying the present invention.
Figure 2:
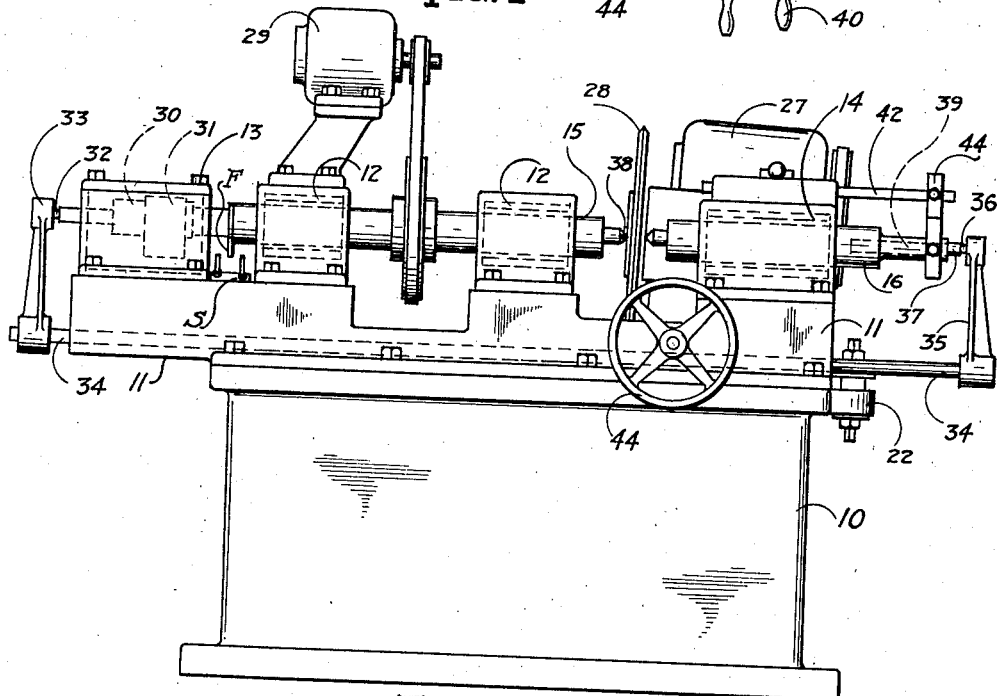
Fig. 2 is a front elevational view thereof.

Referring first to Fig. 2, the machine embodies a base 10 having a bed plate 11 mounted thereon which is machined for the support of a pair of spindle bearing blocks 12, a lead screw bearing block 13 and a foot stock bearing 14, all of which are disposed in coaxial alignment for the support of the spindle 15 and the foot stock spindle 16.

The base of the machine is formed with a rearwardly extended bed 17, the upper face of which is planed or slab milled for the support of a grinding wheel slide or table which, as will be seen in Fig. 3, comprises a plate 18 supported upon the bed by rollers 19 and guided thereon normal to the axis of the spindle 15 by anti-friction bearings 20. The bearings 20 are mounted on eccentric bolts 21 retained in flanges 22 formed in the bed 17. The eccentric bolts or studs for the anti-friction bearings embody shank portions 23 adapted for rotatable adjustment in the bed of the machine and pintles 24 disposed in offset relation to the axis of the shank portions 23 so that the periphery of the bearings may be drawn into intimate engagement with the side wall of the plate 18 or retracted therefrom.

In practice the eccentric mountings are adjusted so that the anti-friction bearings are forced with appreciate pressure against the side walls of the plate, the eccentrics being tightened after the angular relation of the table relative to the axis of the spindle has been determined.

The upper surface of the plate 18 is finished to receive a pair of bolster blocks 25 which are tapered to position the grinding wheel platen 26 in proper angular relation to the work piece carried by the spindle and foot stock centers. The platen is preferably bolted to the plate 18 to facilitate the ready assembly of bolster blocks tapered for threads of different helical angles and, as shown, the platen is construtced for the support of an electric motor 27 provided as the driving medium for the grinding wheel 28.

The spindle 15 is driven from an electric motor 29 having a drive pulley on the armature shaft thereof belted to a second pulley mounted on the spindle 15. The motor 29 is operatively controlled through a pair of reversing switches S, which are actuated by a finger F carried by the spindle 15. The outer end of the spindle is formed with a lead screw 30 engaged with a nut 31 retained against axial movement in the bearing block 13. As the spindle is rotated and moved axially under the influence of the lead screw 30 the finger F will alternately engage the switches S and thus cause the reversal of the motor and consequent reciprocative movement of the spindle 15.

The outer end of the spindle 15 is recessed for the reception of a ball 32 which is engaged by an arm 33 mounted on a rod 34 extending through the bed plate 11. The opposed end of the rod is provided with a similar arm 35 adapted to support a ball 36 seated in a plunger 37 mounted in the bored end of the foot stock spindle 16. The spindle 16 is urged toward the live center 38 by a spring 39 mounted in the bored end of the spindle and engaged by the plunger 37. The upper face of the foot stock bearing is machined for the support of a dead center release mechanism which comprises a hand operated lever 40 pivotally supported upon a plate 41 mounted on the bearing 14. The plate is formed with a boss bored throughout its length for the reception of a rod 42 drilled for the retention of a pin 43 mounted in the lever 40. The outer end of the rod 42 is provided with a depending yoke 44 having pins therein engaged with the spindle 16.

As illustrated in Fig. 8, the foot stock spindle is mounted in an anti-friction bearing comprising a hardened and ground bushing mounted in the bearing block and extended throughout the length thereof, a perforate sleeve or cage shorter in length than the bushing, hardened balls freely movable in the cage and a pair of discs or stop plates adjacent the ends of the bushings to delimit the movement of the cage. The balls are mounted in press fit engagement between the spindle and bushing hence when the movement of the cage is arrested by the stop plates in the ends of the bearing the balls will lock the spindle from further translation within the bearing block.

With the movement of the spindle 16 thus restricted the spring 39 will be under constant compression and thus maintain the thrust balls 36 in seated relation with the arms and spindles with which they are associated. Obviously the inward movement of the dead center spindle may be arrested by various other instrumentalities such, for example, as a collar or similar stop mechanism mounted on the outer end of the spindle.

In operation as the lever 40 is actuated towards the end of the machine the spring 39 will yield and afford sufficient movement of the spindle 16 to facilitate the removal of the work. Upon release of the lever 40 the spring will urge the dead center inwardly sustaining the work compressively against the live center 38. As the spindle is advanced under the influence of the lead screw 30 the spring load upon the work will remain constant since the yoke construction afforded by the arms 33 and 35 and rod 34 will facilitate like movement of the spindle 16. Obviously, with the spring pressure thus confined to the work during the axial movement of the spindle 15 unequal wear upon the lead screw will be eliminated.

During the operation of the machine the grinding wheel 26 is brought into engagement with the work by operation of a hand wheel 44 mounted on a feed screw 45 connected with the table 18. A dial indicator mounted on the bed of the machine and engaged with the table is preferably employed to determine the depth of cut and table position therefor. The position of the grinding wheel after dressing is likewise determined by the dial indicator though adjustable stops and graduated feed dials may be employed if desired.

With the spindle and foot stock bearings mounted in the manner above described and with the table or tool slide structure provided herein it has been found in practice that the bed 17 may be machined by merely rough planing or slab milling the upper surface of the base casting, mounting the bearing blocks 12, 13 and 14 thereon, aligning the bores in the bearing blocks with an arbor, then clamping the blocks in position with the arbor in place.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A grinding machine comprising a base, a bed plate affixed thereon, a pair of spindle bearing blocks affixed on said bed plate, a work driving spindle journalled in said bearings, a thread on the outer end of said spindle, a nut affixed upon said bed plate and engaged with said thread, a reversible motor mounted on said bed plate, a belt connecting said motor with said spindle, a foot stock bearing affixed upon said bed plate, a foot stock spindle mounted for reciprocative movement therein, a plate mounted on said base for reciprocative movement normal to said work driving spindle, a grinding wheel mounted thereon, a motor mounted on said plate belted to said grinding wheel, thrust bearings in the outer ends of said work driving spindle and said foot stock spindle, depending arms engaged with said thrust bearings, and a rod connected with and suspended by said arms for imparting reciprocative movement from the work driving spindle to the foot stock spindle.

2. A grinding machine comprising a bed, a spindle bearing rigidly supported thereby, a spindle therein, a thread on said spindle, a nut engaged with said thread and secured against axial movement relative thereto, a motor mounted on said bed operatively connected with said spindle, a foot stock bearing rigidly supported on said bed, a dead center mounted for restricted reciprocative movement therein, a grinding wheel mounted on said bed for reciprocative movement towards and away from said spindle, a ball mounted in the end of said spindle, an arm engaged therewith, a rod affixed upon said arm, a ball seated in the end of said dead center, an arm engaged therewith and affixed to said rod, and a spring mounted within said dead center to maintain the balls in seated relation with said arms, said spindle and said dead center.

3. A grinding machine comprising a bed, a spindle bearing rigidly supported thereby, a spindle therein, a thread on said spindle, a nut engaged with said thread and secured against axial movement relative thereto, a motor mounted on said bed operatively connected with said spindle, a foot stock bearing rigidly supported on said bed, a dead center mounted for restricted reciprocative movement therein, a grinding wheel mounted on said bed for reciprocative movement towards and away from said spindle, and a yoke spanning the ends of said spindle and said dead center and supported in spring pressed relation therewith.

OTTIS R. BRINEY, Jr.